(12) United States Patent
Davi et al.

(10) Patent No.: US 8,286,787 B2
(45) Date of Patent: Oct. 16, 2012

(54) CHAIN FOR A CONVEYOR

(75) Inventors: Danielle Davi, Ferrara (IT); David Rosignoli, Ferrara (IT)

(73) Assignee: CT PACK S.r.l., Crespellano, Bologna (IT)

( * ) Notice: Subject to any disclaimer, the term of this patent is extended or adjusted under 35 U.S.C. 154(b) by 69 days.

(21) Appl. No.: 12/452,507

(22) PCT Filed: Feb. 27, 2008

(86) PCT No.: PCT/IB2008/000552
§ 371 (c)(1),
(2), (4) Date: Mar. 10, 2010

(87) PCT Pub. No.: WO2009/007800
PCT Pub. Date: Jan. 15, 2009

(65) Prior Publication Data
US 2010/0193334 A1    Aug. 5, 2010

(30) Foreign Application Priority Data
Jul. 10, 2007    (IT) .............................. MI2007A1372

(51) Int. Cl.
B65G 17/42    (2006.01)
(52) U.S. Cl. ......... 198/851; 198/817; 198/852; 198/853
(58) Field of Classification Search .................. None
See application file for complete search history.

(56) References Cited

U.S. PATENT DOCUMENTS

| | | | | |
|---|---|---|---|---|
| 5,873,452 A | * | 2/1999 | Nolan | 198/465.3 |
| 6,868,959 B2 | * | 3/2005 | Thomas et al. | 198/465.3 |
| 2004/0168882 A1 | | 9/2004 | Thomas | |

FOREIGN PATENT DOCUMENTS
EP    0 496 046 A    7/1992

OTHER PUBLICATIONS
PCT Search Report dated Oct. 14, 2008.

* cited by examiner

*Primary Examiner* — Kavel Singh
(74) *Attorney, Agent, or Firm* — Hedman & Costigan, P.C.; James V. Costigan

(57) ABSTRACT

A chain (30) for a conveyor of an apparatus (10) for accumulating and arranging products or packs (P) into groups, is made loop-closed by means of a series of links articulated to each other through connection of pins (32) connected by plates (33), each link is provided with a driving portion (34) and a drawing portion (35) of sliding blocks (50) provided for accommodating the products or packs (P), such drawing portion (35) is provided with guide plates (37, 37') of the sliding blocks (50).

11 Claims, 11 Drawing Sheets

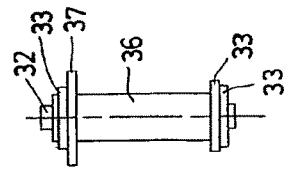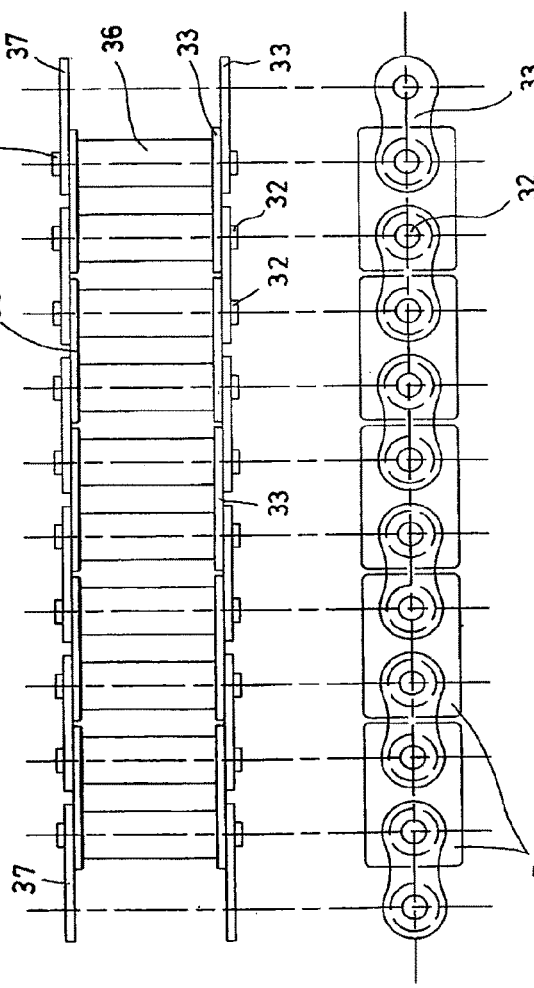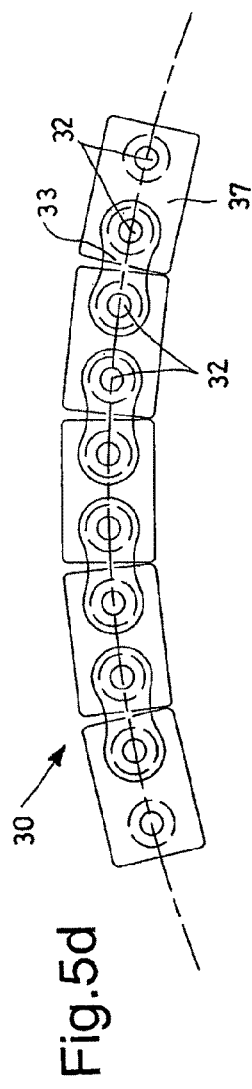

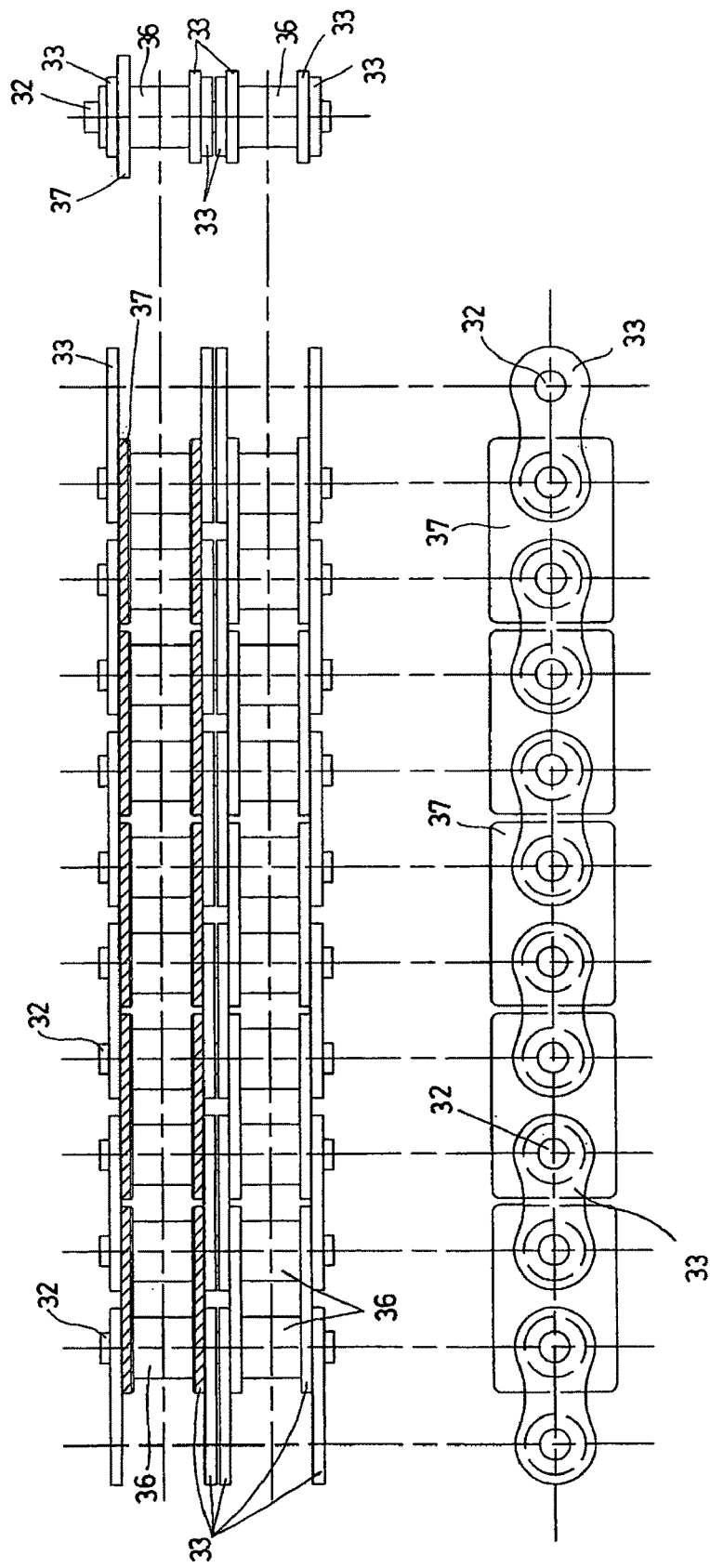

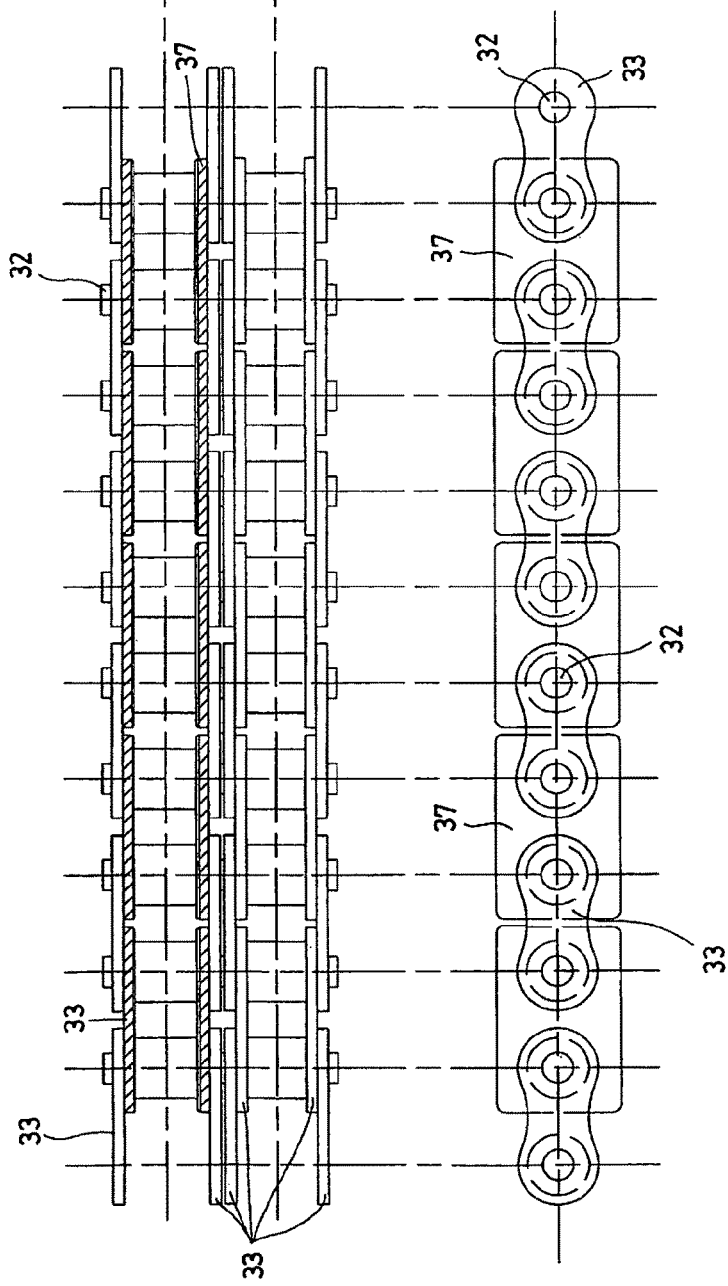

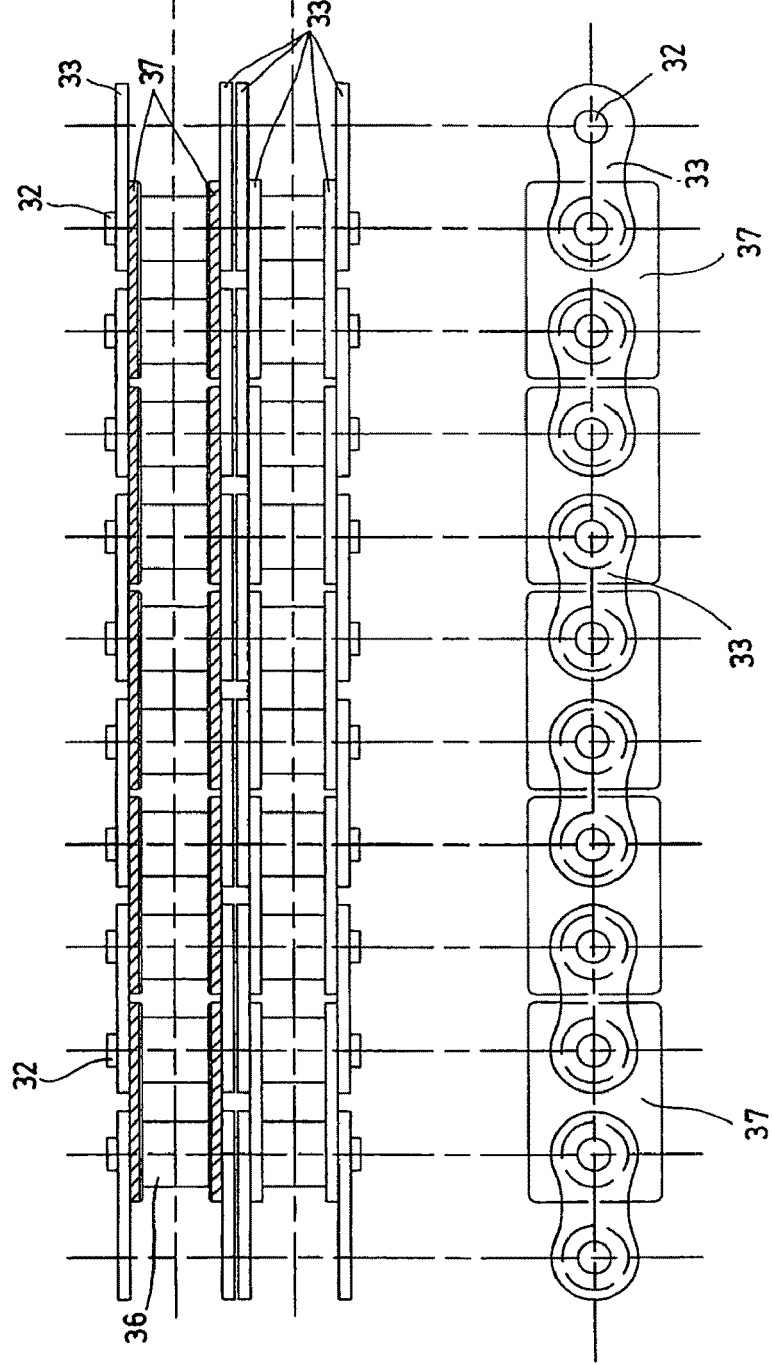

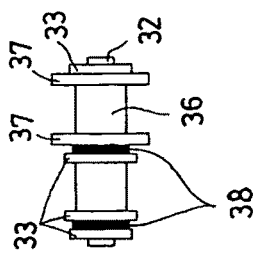
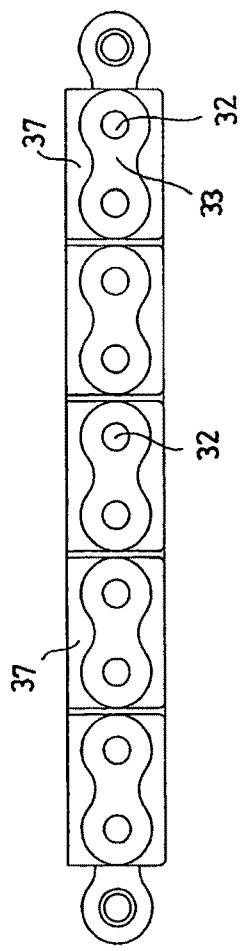
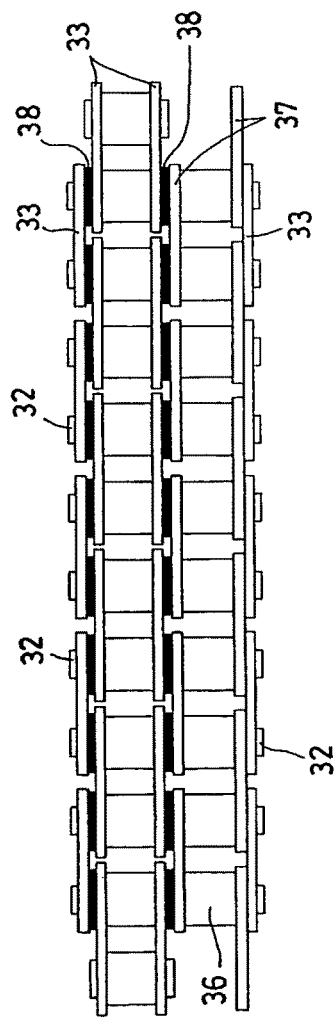

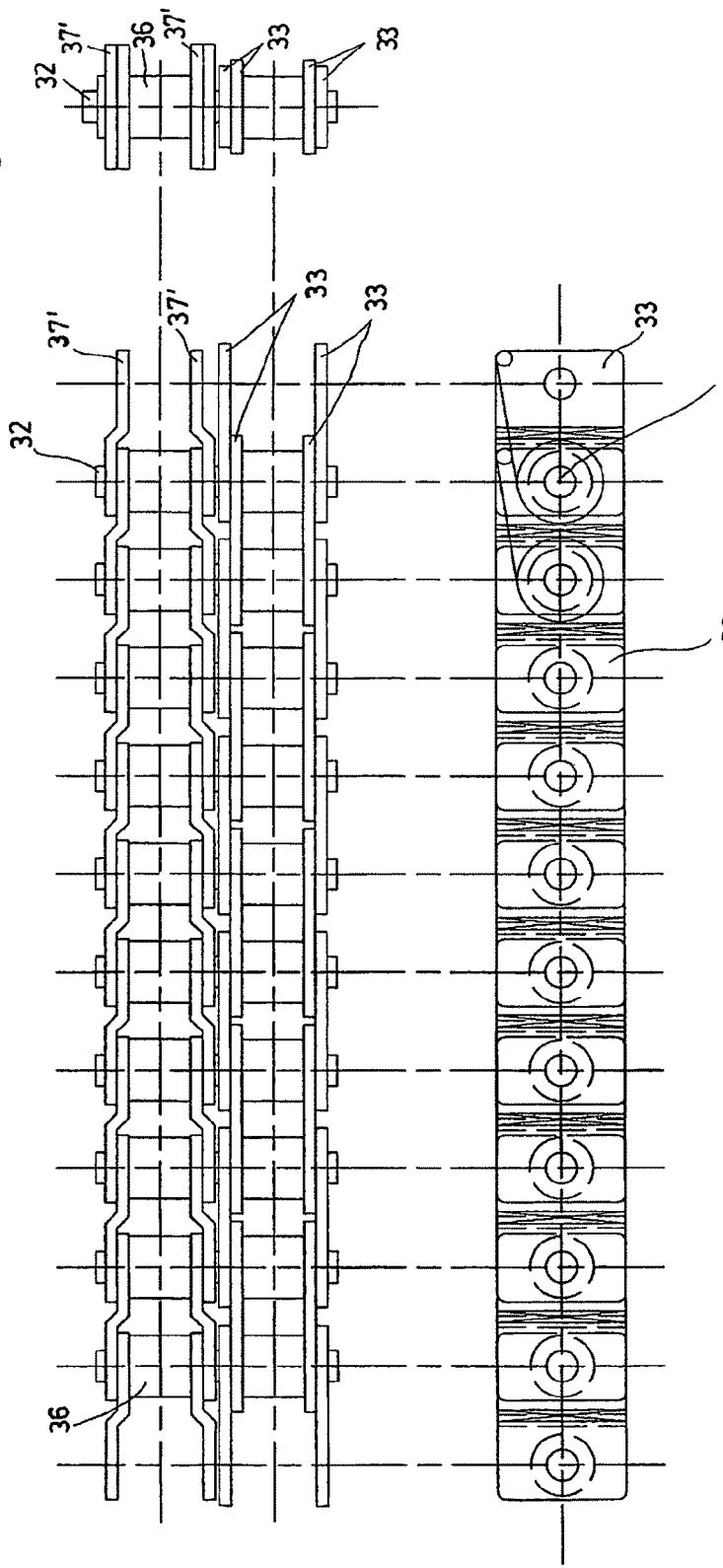

CHAIN FOR A CONVEYOR

The present invention refers to a chain for a conveyor.

In particular, the invention refers to a chain for a conveyor of an apparatus for accumulating and arranging products or packs into groups.

Regardless of the type of elements manufactured and/or treated, systems or production lines comprising a series of apparatus intended for performing various operations—which can range from manufacturing to the final packaging—on the products, have been known over the years.

Thus, the system requires transfer of products from one operating station to the subsequent one and in particular, in the final step, the possibly packed products need to be collected and delivered in an orderly manner for packaging.

Apparatuses intended for gathering products of different types also coming from different lines to deliver them in an orderly manner to the packaging device have been manufactured over the years.

An example of such apparatus is known from the EP0316990 patent of the Applicant which describes an apparatus in which the single products are arranged on separate sliding blocks drawn by a single continuous element in the form of a closed-loop flexible belt and wound around pulleys which on one side is operatively and elastically connected to the single sliding blocks and on the other it is provided with elements for interacting with the two pulleys.

Though functioning excellently, the apparatus according to EP0316990 shows some complexity in the dynamic anchorage system of the sliding blocks to the belt which in particular requires a sliding block which is held against the belt by a floating element loaded by a spring which keeps it in contact with the belt.

A different approach to overcoming the translation drawback is attained by using chains which are more suitable as driving means and which can also serve as supports for the transfer of the sliding blocks.

However, in case of small sliding blocks in the translation direction with respect to the transverse dimension, during the transfer there arises the problem regarding the oscillations of the sliding block around a vertical axis, in other words yawings, which might lead to the sliding block impacting against the plates of the chain dislodging them, derailing the sliding block and wearing it out on the edges.

Thus the applicant thought of a solution to the drawback regarding how translation of small sliding blocks in the translation direction with respect to the transverse dimensions could be ensured.

The applicant overcame the abovementioned drawback by providing a chain for a conveyor provided with guide elements for the sliding blocks.

Furthermore, the Applicant proposes an apparatus for accumulating and arranging products or packs into groups provided with the chain according to the invention through which it is possible to move and arrange products or packs in a quick and efficient manner reducing the wear of the sliding blocks moved.

A first aspect of the present invention regards a chain for a conveyor, intended for an apparatus for accumulating and arranging products or packs into groups, made up of a closed-loop made through a continuous series of links articulated to each other by means of pin connections joined through assembly plates, each link being provided with a driving portion and a drawing portion for the sliding blocks provided for accommodating products or packs, such drawing portion being provided with guide plates for the sliding blocks, according to the description outlined in claim 1.

Further characteristics of the invention and non-superfluous variants of the same, are subject of the dependent claims.

Characteristics and advantages of a chain for a conveyor according to the present invention shall be clearer from the following exemplifying and non-limiting description referring to the attached schematic drawings wherein:

FIGS. 5a-5c show, respectively in side elevation, in plan and in front elevation view, a portion of an extended roller chain according to the invention;

FIG. 5d shows in side elevation view a portion of the chain of FIGS. 5a-5c in the curved configuration it takes when winding around a sprocket.

FIGS. 6a-6c show respectively in side elevation, in plan and front elevation view, a portion of a double chain with external guide plates according to a different embodiment of the invention;

FIGS. 7a-7c show respectively in side elevation, in plan and front elevation view, a portion of a double chain with internal guide plates according to a different embodiment of the invention;

FIGS. 8a-8c show respectively in side elevation, in plan and front elevation view, a portion of a double chain provided with double guide plates according to a different embodiment of the invention;

FIGS. 9a-9c show respectively in side elevation, in plan and front elevation view, a portion of a double O-RING chain provided with offset double guide plates according to a different embodiment of the invention;

FIGS. 11a-11c show respectively, in raised side, in plan and in front raised view, a portion of a double chain provided with a continuous channel double guide plates according to a different embodiment of the invention.

Figure 1:
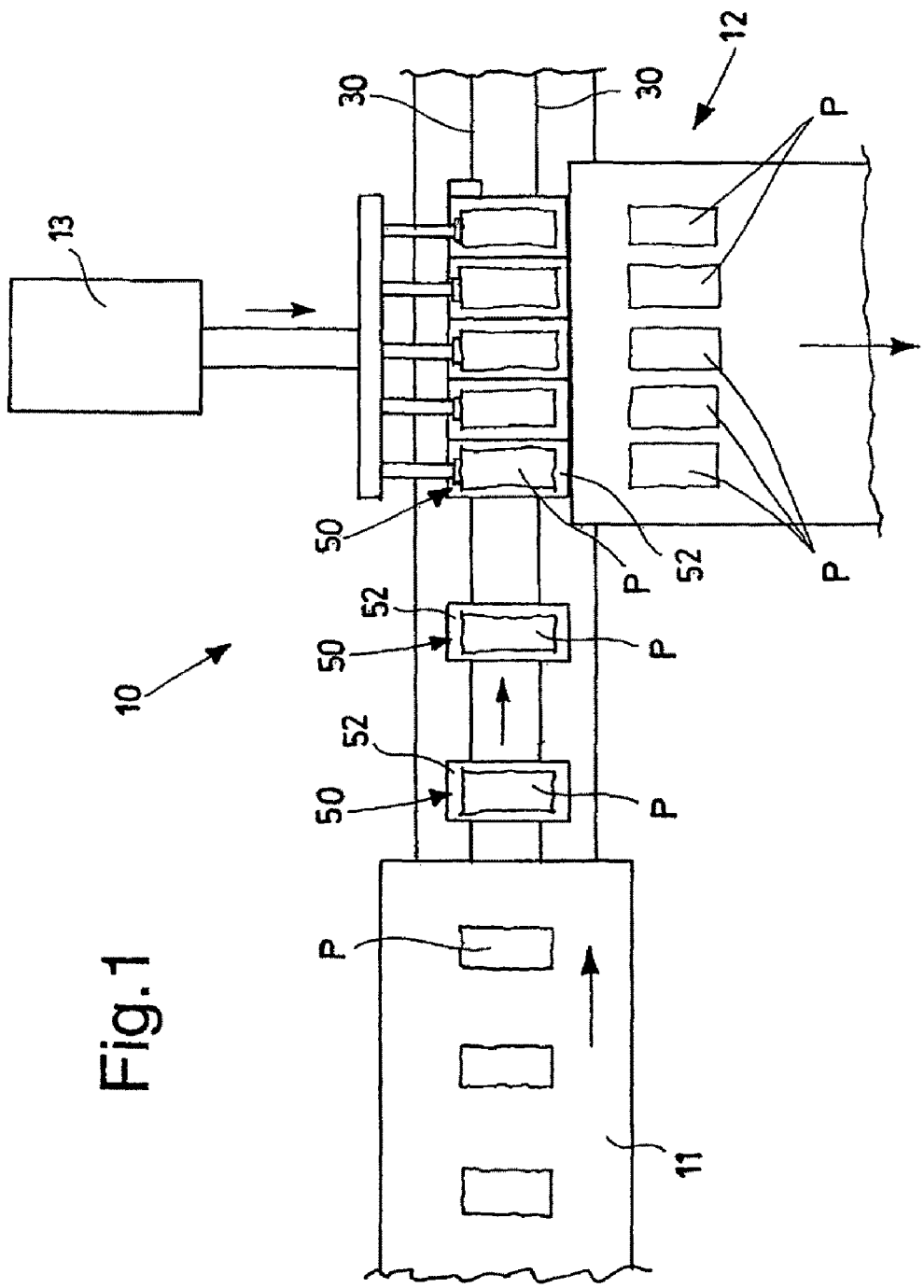
FIG. 1 shows a simplified plan view of an apparatus for accumulating and arranging products or packs into groups arranged between a delivery device and the unloading system and provided with the chain according to the invention.
Figure 2:
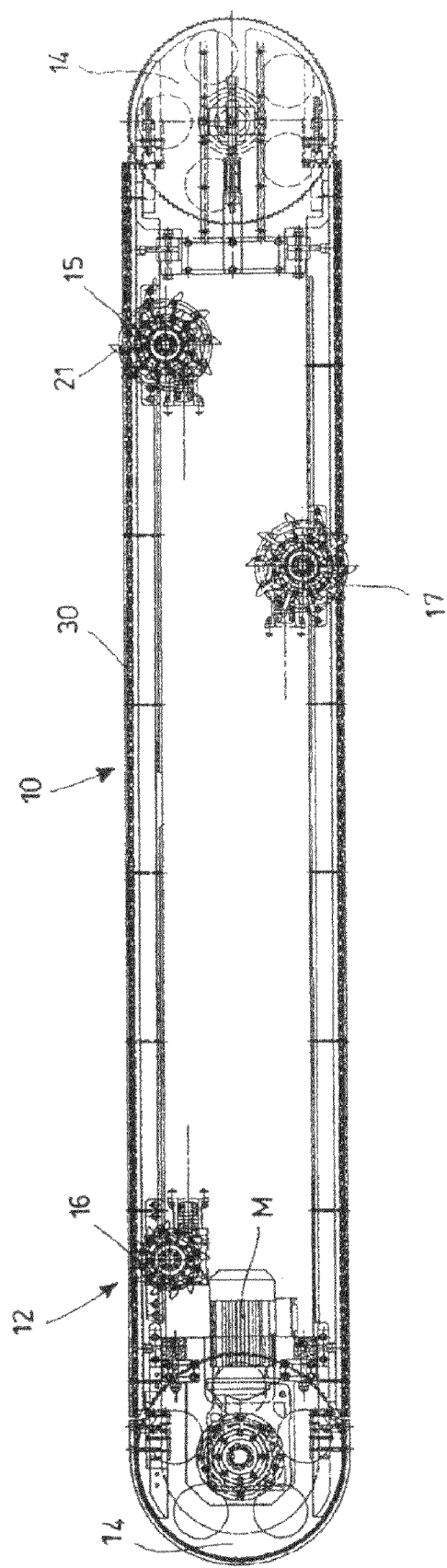
FIG. 2 is a side elevation partial schematic view of an apparatus for accumulating and arranging products or packs into groups provided with the chain according to the invention.
Figure 3:
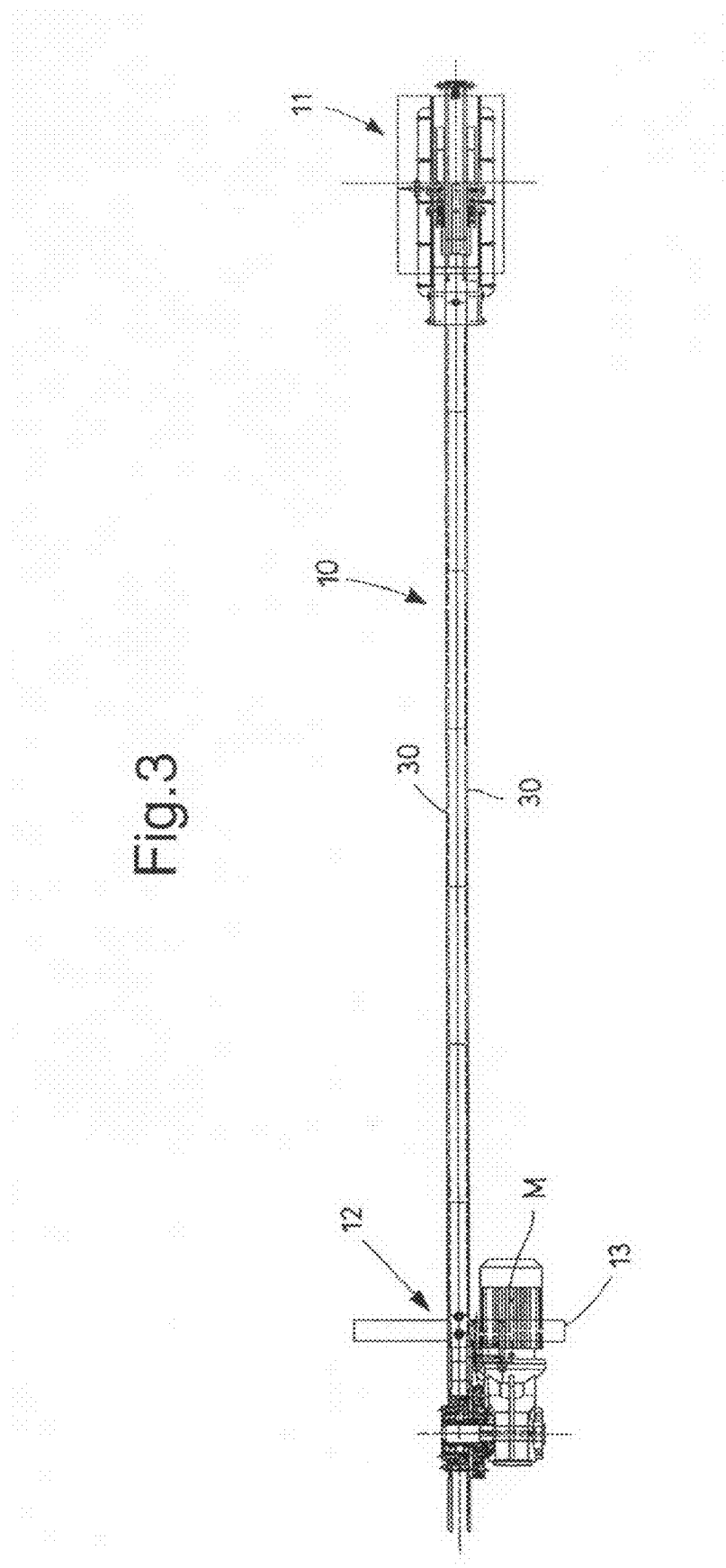
FIG. 3 is a plan schematic view of an apparatus for accumulating and arranging products or packs into groups provided with the chain according to the invention.

Referring to FIGS. 1-4, shown is an apparatus 10 for accumulating and arranging products or packs P into groups arranged and operatively connected between a delivery device 11 located upstream, which provides for delivering the products or packs coming from preceding operations, and an evacuation station 12, located downstream and provided with a suitable unloading device 13 which provides for unloading the products P from the apparatus 10 into groups presettable to convey them to a subsequent station for the performance of a different operation, such as packaging.

The apparatus 10, supported by a suitable framework (not shown for simplicity reasons) comprises at least a closed-loop chain 30, wound around two sprockets 14 one of which is at least a driving gear operated by a gear motor M.

The chain 30 is provided to draw a plurality of sliding blocks 50 to perform the transfer of the products between the delivery device 11 and the unloading system 12 in such a manner to arrange the same coming one at a time from the delivery device and convey them to the subsequent station in groups arranged in a preset manner.

To attain this, between the two sprockets 14 the pathway of the chain 30 is straight and flat in order to allow loading and the travel of the loaded sliding blocks 50.

Thus, the apparatus bears the sliding blocks 50 coupled in a sliding manner with the chain and at least two stop elements 15 and 16 are provided along the pathway of the chain.

Precisely, a first stop element 15 holds the sliding blocks separately in proximity to the delivery device 11 in such a manner that each sliding block receives the corresponding product or pack, and a second stop element holds the sliding blocks upon arrival at the evacuation station 12 up to the attainment of the preset number for the intervention of the unloading operation 13 which provides for emptying the sliding blocks 50 and channelling a presettable group of products or packs P to the subsequent operating station.

Advantageously there is also a third stop element 17 along the lower rectilinear branch of the apparatus 10 with the aim of dosing the sliding blocks in the curvilinear section in a constant manner, The stop elements 15, 16 and 17 can be of any type and they have at least one device intended to intercept or not intercept holding means provided on each sliding block for withholding or freeing the latter.

According to a preferred embodiment, the stop elements 15, 16 and 17 are wheels which can be controlled in continuous or step by step rotation on a plane parallel to the movement direction of the sliding blocks and are provided with oscillating teeth 21, each held in position by an elastic element (not shown) in such a manner that each tooth can withhold the sliding block in the forward moment direction of the latter and be retractable due to oscillation towards the opposite direction.

The apparatus 10 comprises at least one chain 30 made as a closed-loop by means of a series of links 31 articulated to each other by means of a connection of pins 32 connected by plates 33, 37.

Advantageously the chain is made of rollers 36, inserted on the pins 32.

According to an embodiment of the present invention, each link is provided with a driving portion 34 which winds around the driving teeth with which the sprockets 14 are provided and with a drawing portion 35 of the sliding blocks 50 configured to accommodate products or packs P, such drawing portion 35 is provided with guide plates 37 of the sliding blocks 50.

The rollers 36 are thus held between a double series of alternating plates 33 at an end of the pins and by a series of alternating plates 33 and guide plates 37 at the other end of the pins in such a manner to obtain the articulated connection of the links of the chain and provide along an entire side of the same, a surface of guide plates 37 which thus have also the purpose of connecting the pins in an articulated manner.

Such guide plates 37 are substantially rectangular-shaped with rounded edges in such a manner to provide a surface whose height (a) is substantially continuous and suitably greater than the one of the plates 33 for proper performance of its task without necessarily being excessively distanced.

The guide plates are assembled onto the pins 32 in a longitudinal centreline position in such a manner to project symmetrically above and beneath the plates 33.

As a matter of fact, interferences between the guide plate must be avoided when winding around the sprockets 14 as shown in FIG. 5d which represents a portion of a chain in the curved configuration it takes when winding around a sprocket.

The roller 36 is intended to absorb the friction of the driving operation and pr the sliding blocks which move translated by the chain and hence to increase the lifespan of the chain itself.

With particular reference to FIGS. 5a-5c, the pin 32, in case of a simple link chain, is of the extended type in that the link it provides for must meet both the purpose of driving ending up engaged in the teeth provided on the sprockets 14 and of drawing the sliding blocks coupled to such portion of the chain.

The simple link chain thus has one side the plates 33 and on the other side the plates 33 alternating with guide plates 37.

The preferred embodiment of the invention provides for the application in the apparatus 10 of a pair of parallel chains 30 symmetrically arranged with respect to the longitudinal axis which defines the transport direction of the sliding blocks in such a manner to have the driving portions 34 internally facing and sliding within shaped parallel channels 42 made in the guide 41 of wear and friction resistant material, and the drawing portions 35 arranged towards the external in such a manner to cooperate for the engagement of the sliding blocks 50 suitably provided with coupling means.

A more efficient guide of the sliding blocks is obtainable by means of double chains wherein two distinct rollers 36, separated by the relevant plates 33, 37, are separately inserted on a pin 32.

Examples of such double chains are shown in FIGS. 6a-6c, 7a-7c, 8a-8c, 9a-9c, 10a-10c, 11a-11c.

Referring to FIGS. 6a-6c, shown is a double chain provided with guide plates 37 arranged along a side of the drawing portion.

Though such chain can be used alone for drawing the sliding blocks, it is preferably combined with another chain specular to it in such a manner that the sliding block provided with coupling means arranged on both sides is drawn without the possibility of yawing or and/or derailing.

The chain starting from the drawing portion thus comprises for each link: a pair of pins constrained by a plate 33, inserted on each of said pins is a guide plate 37 for providing the sidewall of a greater height and for connecting the pin with a pin of an adjacent link, then inserted on each pin is a roller and other two plates 33 which connect the pin with a pin of an adjacent link, the drawing portion of the link is hence closed by another plate 33 which connects the two pins 32 of a link.

Thus assembled on the two pins themselves is the driving portion which is substantially identical to the drawing portion except for the guide plates which are replaced by plates 33.

The driving portion of the link thus comprises a plate 33 inserted on two pins 32 of the link, inserted on each of said two links is another plate 33 for connecting the pin with a pin of an adjacent link, then inserted on each pin is a roller and other two plates 33 which connect the pin with a pin of an adjacent link, the driving portion of the link is hence closed by another plate 33 which connects the two pins 32.

In a different embodiment, of the chain shown in FIGS. 7a-7c, the guide plates 37 of the drawing portion are assembled at a central position in proximity to the driving portion.

In a different embodiment of the chain shown in FIGS. 8a-8c, the guide plates 37 are assembled on both sides of the drawing portion, thus obtaining a channel which further holds the sliding block.

Shown in FIGS. 9a-9c is a double O-RING chain with guide plates 37 assembled on both sides of the drawing portion. In such chain, the O-RINGs 38 are inserted in the driving portion between the plates 33 on one side and between the plates 33 and the guide plates on the other side of the driving portion which is adjacent to the drawing portion.

The O-RING chain is thus simplified regarding the plates, as a matter of fact the guide plates assembled internally are in direct contact with the O-RINGs 38 and serve both as connections of the pins of the driving portion and as connections and holding elements of the pins 32 in the drawing portion.

Figure 10C:
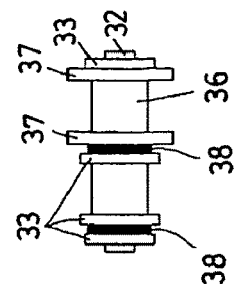
FIGS. 10a-10c show respectively in side elevation, in plan and front elevation view, a portion of a double O-RING chain provided with offset double guide plates and a sliding plate according to a different embodiment of the invention.
Figure 10A:
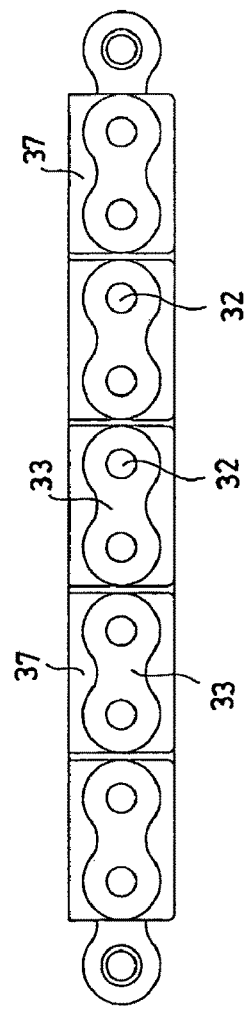
Figure 10B:
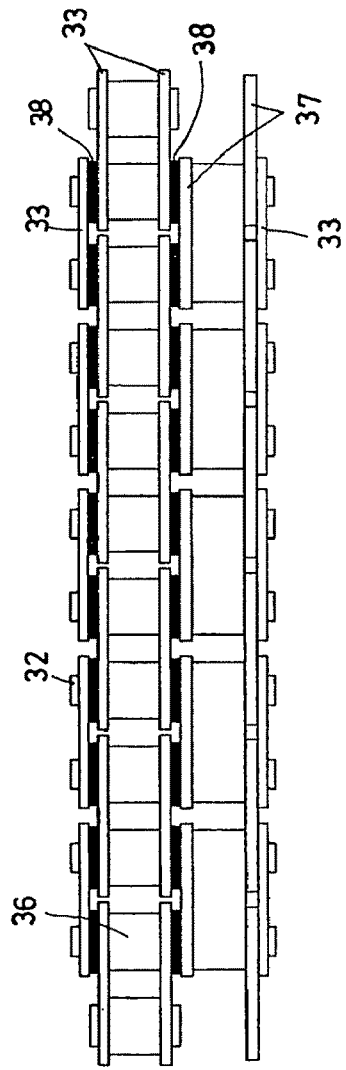

Referring to FIGS. 10a-10c shown is a double O-RING chain 38 with guide plates 37 assembled on both sides of the drawing portion and with the drawing portion provided with sliding plates 39 instead of the rollers 36.

Such sliding plates 39 have an extended shape in such a manner to comprise two adjacent pins and they are intended to reduce the translation noise generated by the chain.

In both O-RING chains 38 the guide plates 37 are assembled in an offset manner on the pins in such a way that the pins of a link are connected to each other by a guide plate on one side of the drawing portion while on the opposite side the same pins are connected by two guide plates to the adjacent pins.

Referring to FIGS. 11a-11c shown is a continuous channel chain in the drawing portion configured as a chain with false links obtained by means of z-shaped guide plates 37' in such a manner that each guide plate in the connection of adjacent pins is laid over the preceding guide plate and laid under the subsequent one in an alternating manner to.

Figure 4:
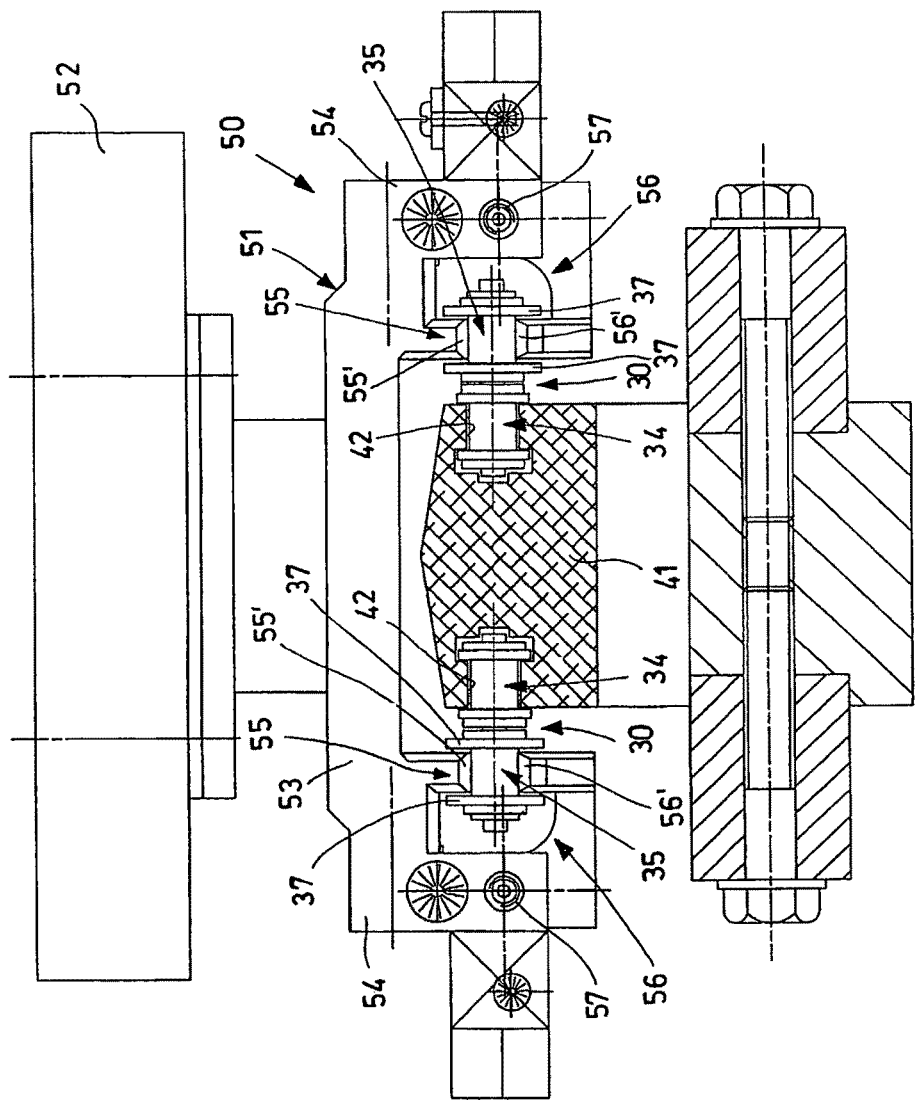
FIG. 4 is a front elevation partial section of a detail of the apparatus of FIGS. 1 and 2 showing a sliding block coupled with a pair of parallel chains.

In FIG. 4 illustrated is a sliding block 50 and in particular its sliding coupling system to a pair of double chains parallel in the horizontal section of the apparatus 10 between the delivery device 11 and the evacuation station 12.

The sliding block 50 comprises a base 51 overlapped by a plate 52 intended to receive the products or packs to be transferred.

The base 51 is made to form an inverted U-shape with a bottom 53 and two flaps 54 in such a manner to contour the guide 41 from whose sides the drawing portions 35 of the two parallel chains 30 extend.

The base 51 is internally configured to form a clamp whose jaws correspond to the size of the drawing portion of the chain.

Two first jaws 55 are fixed and integral with the base and they project internally from the lower side part of the bottom 53 for contacting the drawing portion of the corresponding chain 30 from above.

Fixed in an oscillating manner substantially at the end of each flap 54 is a second jaw 56 which can thus be controlled in oscillation around a fulcrum 57 by means of a spring or other elastic means (not shown) for contact, through adjustable pressure, from beneath, the chain drawing portion 35 in such a manner that the sliding block 50 is seamed on the two external sides of the chains 30 with an adjustable pressure in such a manner to be drawn due to friction by the moving chain but be withheld by the stop elements 15, 16 and 17 when required.

The jaws 55 and 56 end in square-shaped profiles 55' and 56' respectively, which are oppositely positioned closing on the drawing portion 35 of the chain with a minimum clearance with respect to the guide plates 37, 37' and/or plates 33 provided.

By oppositely positioning the guide plates 37, 37' mounted only on one side or both sides of the drawing portion of each chain with such square-shaped profiles of the jaws of the sliding block the transfer movement of the sliding block is constrained preventing damaging yawing oscillations.

Generally, it is possible to manufacture a drawing apparatus provided with only one chain and a corresponding sliding block bearing jaws only on one side, however the preferred embodiment has doubled and symmetric elements in such a manner to distribute the effects of the drawing operation on the two sides.

Obviously, the various embodiments described and shown fall within the common principle of the sliding block guide implemented by means of the guide plates which, operating in pairs or separately prevent the yawing oscillation of the sliding blocks.

The invention claimed is:

1. Chain (30) for a conveyor of an apparatus (10) for accumulating and arranging products or packs (P) into groups, the chain (30) being made loop-closed by means of a series of links articulated to each other through a connection of pins (32) connected by plates (33), wherein each link is provided with a driving portion (34) and a drawing portion (35) of sliding blocks (50) provided for accommodating the products or packs (P), such drawing portion (35) being provided with guide plates (37, 37') of the sliding blocks (50), wherein said guide plates (37, 37') are substantially rectangular shaped with rounded edges, are made with a height (a) suitably greater than the one of the plates (33), and are assembled on pins in longitudinal centreline position in such a manner to project symmetrically above and beneath the plates (33), wherein said chain is provided with rollers (36) inserted on said pins (32) and wherein said chain is a double chain in which two distinct rollers (36) are separately inserted on the same pin (32), separated by the relative plates (33, 37) in such a manner to provide the driving portion (34) separated from the drawing portion (35), and wherein said chain is a double O-RING chain (38) with guide plates (37) assembled on both sides of the drawing portion, the O-RINGS (38) are inserted in the driving portion between the plates (33) on one side and between the plates (33) and the guide plates (37) on the other side of the driving portion which is adjacent to the drawing portion, the guide plates assembled in proximity to the driving portion are directly in contact with the O-RINGs (38) and serve both for connections between the pins (32) for the driving portion and for holding and connection between the same pins (32) in the drawing portion.

2. Chain (30) for a conveyor according to claim 1, wherein said double O-RING chain (38) has the drawing portion provided with sliding plates (39) instead of rollers (36).

3. Chain (30) for a conveyor according to claim 1, wherein in said O-RING (38) chain (30) the guide plates (37) are assembled in an offset manner on the pins in such a manner that the pins of a link are connected to each other by a guide plate on one side of the drawing portion while on the opposite side the same pins are connected by two guide plates to the adjacent pins.

4. Chain (30) for a conveyor of an apparatus (10) for accumulating and arranging products or packs (P) into groups, the chain (30) being made loop-closed by means of a series of links articulated to each other through a connection of pins (32) connected by plates (33), wherein each link is provided with a driving portion (34) and a drawing portion (35) of sliding blocks (50) provided for accommodating the products or packs (P), such drawing portion (35) being provided with guide plates (37, 37') of the sliding blocks (50), wherein said guide plates (37, 37') are substantially rectangular shaped with rounded edges, are made with a height (a) suitably greater than the one of the plates (33), and are assembled on pins in longitudinal centreline position in such a manner to project symmetrically above and beneath the plates (33), wherein said chain is provided with rollers (36) inserted on said pins (32) and wherein said chain is a double chain in which two distinct rollers (36) are separately inserted on the same pin (32), separated by the relative plates (33, 37)

in such a manner to provide the driving portion (34) separated from the drawing portion (35), and wherein said chain is a continuous channel chain in the drawing portion (35) configured as a chain with false links obtained by means of z-shaped guide plates (37') in such a way that each guide plate (37') in the connection of adjacent pins is laid over the preceding guide plate (37') and laid under the subsequent one in an alternating manner.

5. Apparatus (10) for accumulating and arranging products or packs (P) into groups, comprising a pair of parallel chains (30) the chain (30) being made loop-closed by means of a series of links articulated to each other through a connection of pins (32) connected by plates (33), wherein each link is provided with a driving portion (34) and a drawing portion (35) of sliding blocks (50) provided for accommodating the products or packs (P), such drawing portion (35) being provided with guide plates (37, 37') of the sliding blocks (50), wherein each of said sliding blocks (50) comprises a base (51) overlapped by a plate (52) intended to receive the products or packs (P) to be transferred, and wherein said base (51) is made to form an inverted U-shape with a bottom (53) and two flaps (54) in such a manner to contour a guide (41) from whose sides the drawing portions (35) of the two parallel chains (30) extend.

6. Apparatus (10) according to claim 5, wherein said base (51) is internally configured to form a clamp whose jaws correspond to the size of the drawing portion of the chain, two first jaws (55) are fixed and integral with the base (51) and they project internally from the lower side part of the bottom (53) for contacting the drawing portion of the corresponding chain (30) from above, fixed in an oscillating manner substantially at the end of each flap (54) is a second jaw (56) which can be controlled in oscillation around a fulcrum (57) by means of a spring or other elastic means to contact, through adjustable pressure, from beneath, the chain drawing portion (35).

7. Apparatus (10) according to claim 6, wherein said jaws (55, 56) end in square-shaped profiles respectively (55', 56') which are oppositely positioned closing on the drawing portion (35) of the chain with a minimum clearance with respect to the guide plates (37, 37') and/or plates (33) provided.

8. Chain (30) for a conveyor of an apparatus (10) for accumulating and arranging products or packs (P) into groups, the chain (30) being made loop-closed by means of a series of links articulated to each other through a connection of pins (32) connected by plates (33), wherein each link is provided with a driving portion (34) and a drawing portion (35) of sliding blocks (50) provided for accommodating the products or packs (P), such drawing portion (35) being provided with guide plates (37, 37') of the sliding blocks (50), wherein said guide plates (37, 37') are substantially rectangular shaped with rounded edges, are made with a height (a) suitably greater than the one of the plates (33), and are assembled on pins in longitudinal centreline position in such a manner to project symmetrically above and beneath the plates (33), wherein said chain is provided with rollers (36) inserted on said pins (32) and wherein said chain is a double chain in which two distinct rollers (36) are separately inserted on the same pin (32), separated by the relative plates (33, 37) in such a manner to provide the driving portion (34) separated from the drawing portion (35), and wherein said chain comprises:

the drawing portion comprising a pair of pins (32) constrained by a plate (33), inserted on each of said pins (32) is a guide plate (37) for providing the sidewall of greater height and for connecting a pin (32) of a link with a pin (32) of an adjacent link, inserted on each pin (32) is a roller (36) and other two plates (33) which connect the pin with a pin of an adjacent link, the drawing portion of the link is thus closed by another plate (33) which connects the two pins (32) of a link; and the drawing portion comprising a plate (33) inserted on the two pins (32) of the link, inserted on each of said pins is another plate (33) for connecting the pin of a link with a pin of one of the two adjacent links, inserted on each pin is a roller (36) and other two plates (33) which connect the pin with a pin of an adjacent link, thus the driving portion of the link is closed by another plate (33) which connects the two pins (32) of a link.

9. Chain (30) for a conveyor according to claim 8, wherein said guide plates (37) of the drawing portion (35) are assembled at a central position in proximity to the driving portion (34).

10. Chain (30) for a conveyor according to claim 9, wherein said guide plates (37) are assembled on both sides of the drawing portion (35).

11. Chain (30) for a conveyor according to claim 3, wherein in said O-RING (38) chain (30) the guide plates (37) are assembled in an offset manner on the pins in such a manner that the pins of a link are connected to each other by a guide plate on one side of the drawing portion while on the opposite side the same pins are connected by two guide plates to the adjacent pins.

* * * * *